Dec. 24, 1957  J. G. BACKUS  2,817,763
ION SOURCE FOR A CALUTRON
Filed Aug. 28, 1946  5 Sheets-Sheet 2
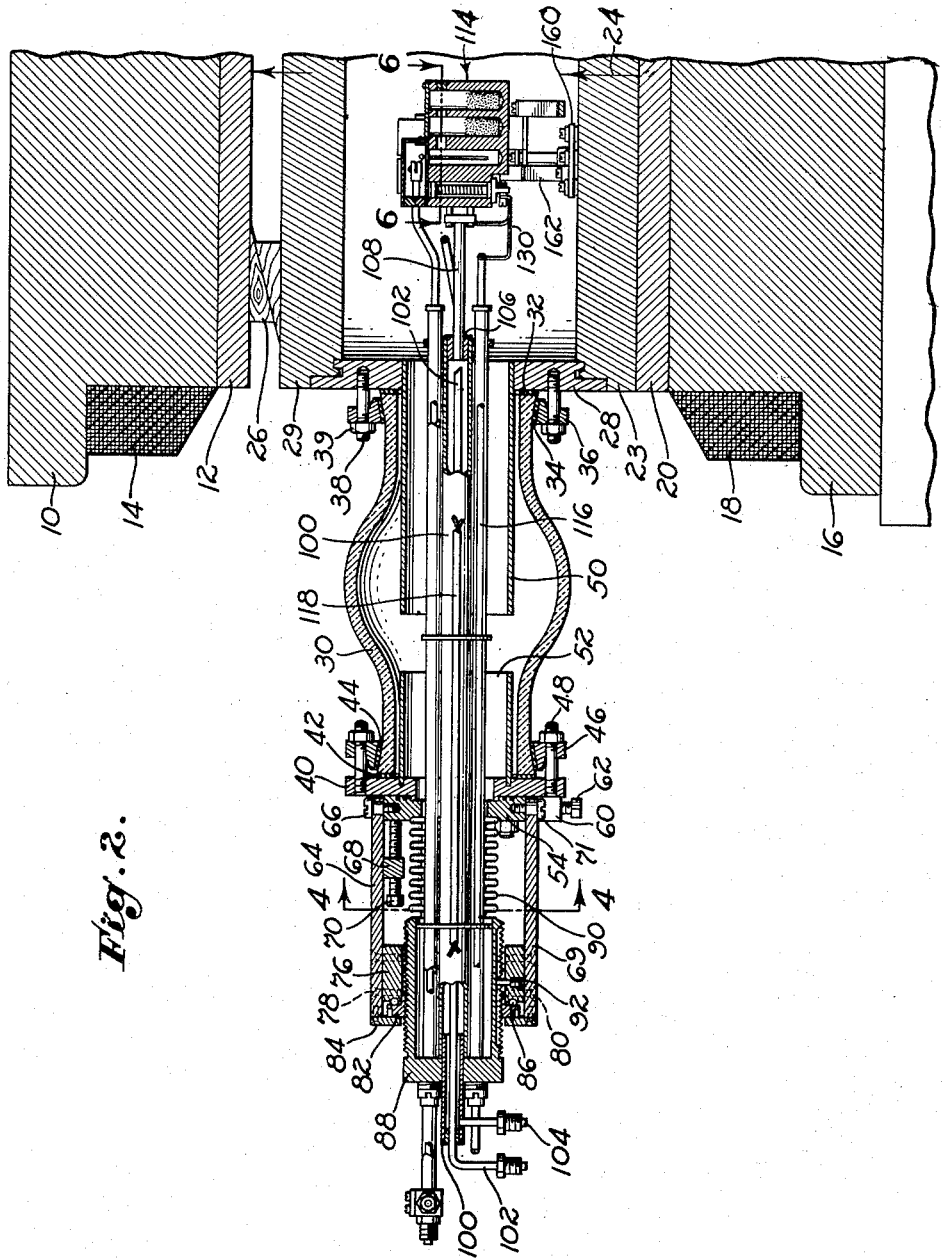
INVENTOR.
JOHN G. BACKUS
BY
ATTORNEY.

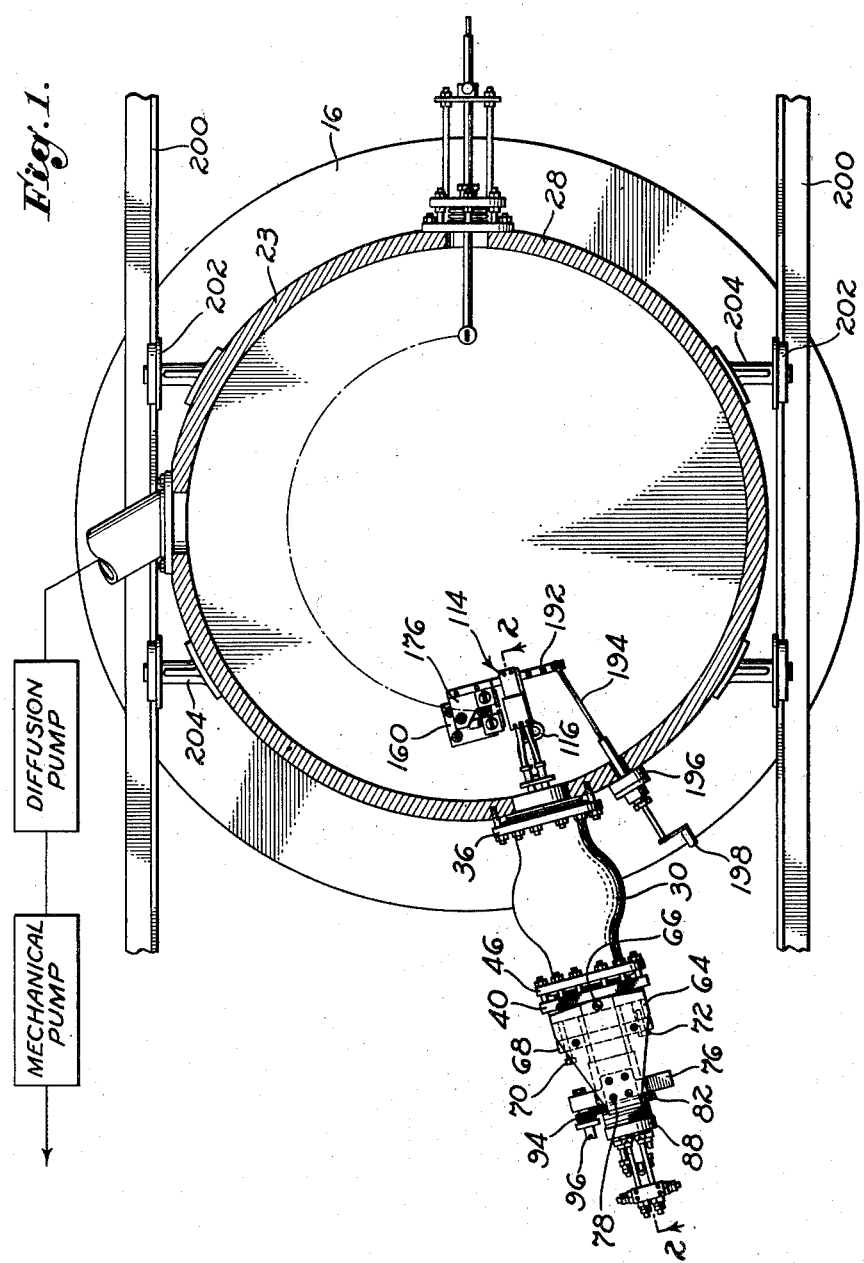

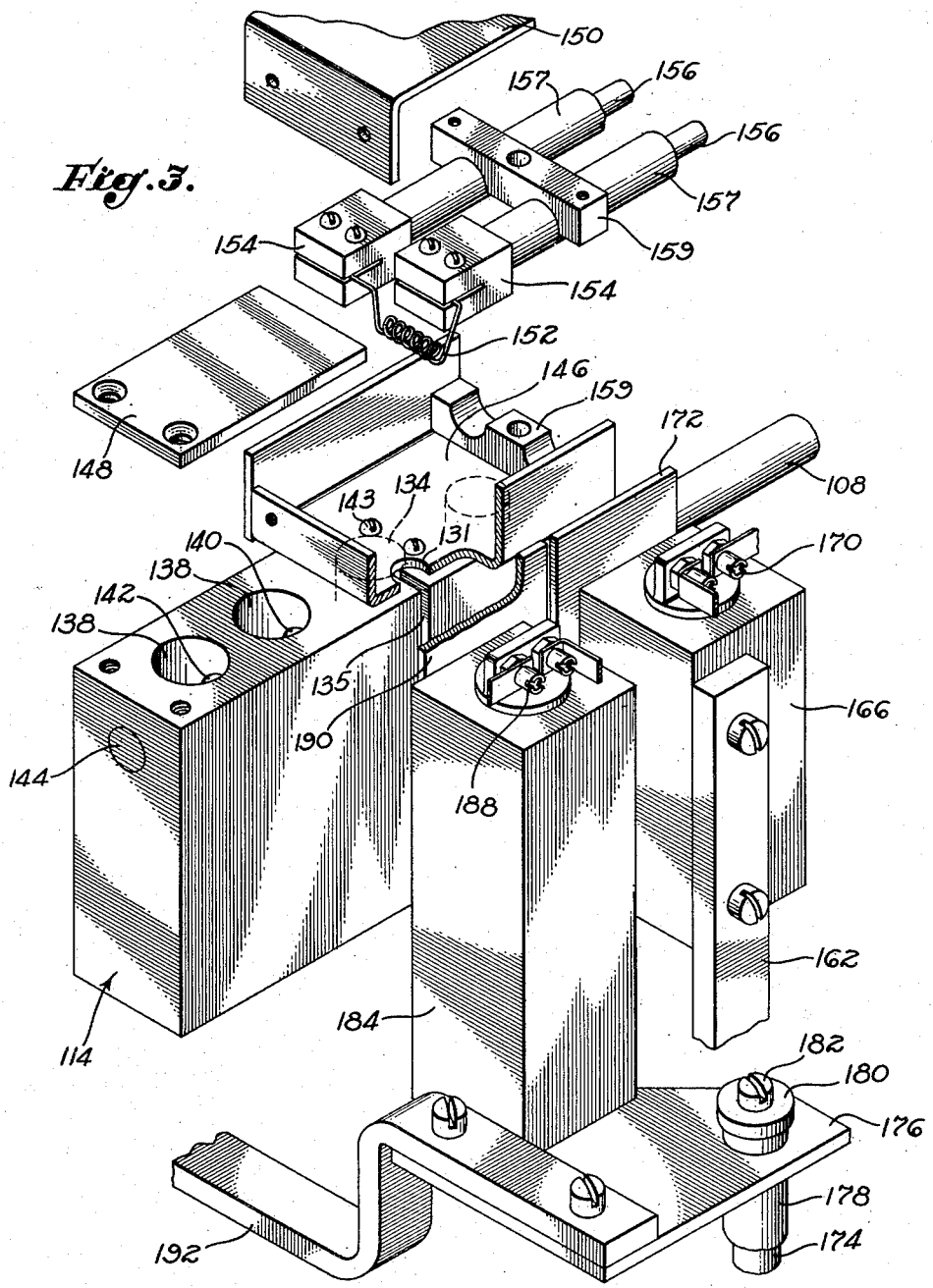

Dec. 24, 1957  J. G. BACKUS  2,817,763
ION SOURCE FOR A CALUTRON
Filed Aug. 28, 1945  5 Sheets-Sheet 4
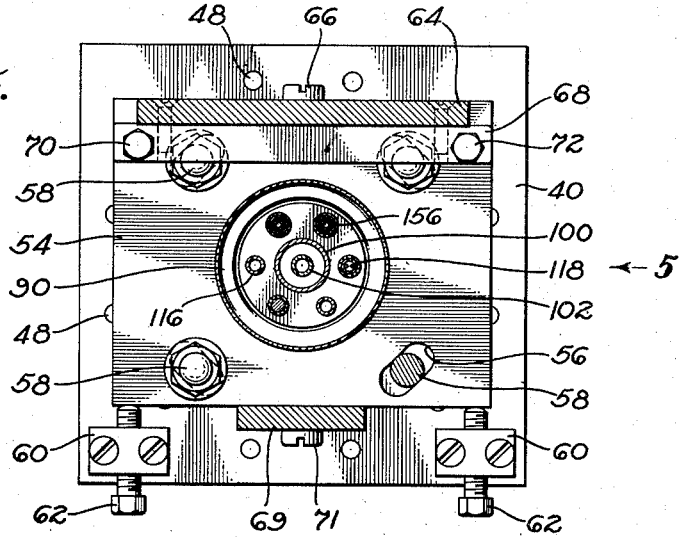
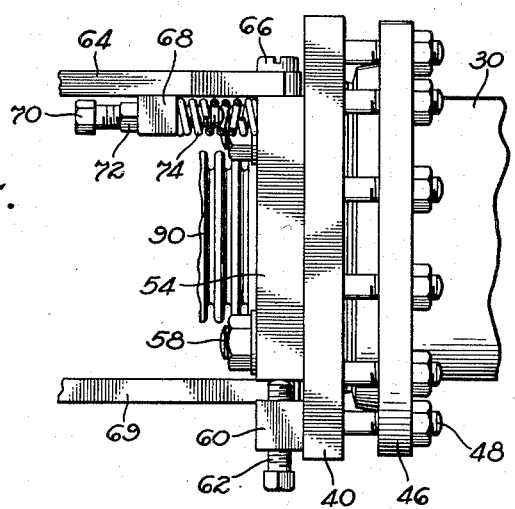
INVENTOR,
JOHN G. BACKUS
BY
ATTORNEY.

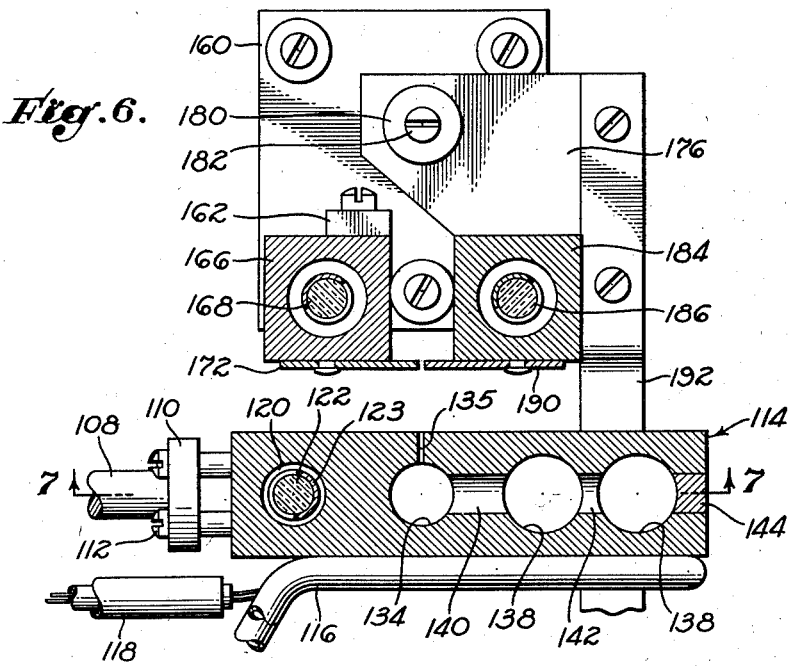
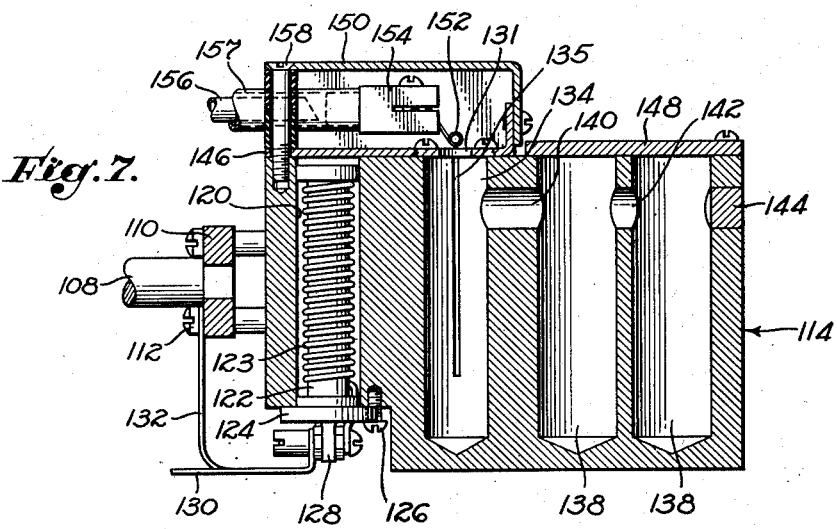

United States Patent Office 2,817,763
Patented Dec. 24, 1957

2,817,763

ION SOURCE FOR A CALUTRON

John G. Backus, Berkeley, Calif., assignor to the United States of America as represented by the United States Atomic Energy Commission Application August 28, 1945, Serial No. 613,158

3 Claims. (Cl. 250—41.9)

The present invention relates to the art of treating a polyisotopic substance to produce a plurality of segregable masses wherein the normally occurring distribution of the constitutent isotopes has been altered so that one of the masses produced is enriched with respect to at least one isotope. More specifically, the invention relates to a device of the type known in the art as a "calutron," a term which has been defined as "any apparatus or machine wherein isotope separation or enrichment is achieved on a large scale, yielding commercially useful quantities of one or more isotopes, by appropriate separative action on gaseous ions with electrostatic or electromagnetic means or combinations of them."

The foregoing definition has been taken from an application for Letters Patent of the United States, Serial No. 557,784, filed on October 9, 1944, by Ernest O. Lawrence, now U. S. Patent No. 2,709,222, granted May 24, 1955. In that application, the theory of isotopic separation and the principles of operation of a calutron are so fully treated and thoroughly explored that no useful purpose would be served by here repeating the discussion contained therein.

It may be stated in passing, however, that by projecting a beam of positive ions of a vaporized or gaseous polyisotopic substance through an evacuated receptacle disposed in a magnetic field acting normally to the path of the beam, the beam is caused to follow a curve wherein the ions of the heavier isotope tend to concentrate in the region adjacent the outer periphery and the ions of the lighter isotope congregate in the region adjacent the inner periphery. In other words, ions of greater mass travel along a curve of greater radius than the ions of lesser mass. By disposing suitable pockets or collectors in the path of the beam, preferably 180° from the source of the beam, it is possible to collect at least two masses, one of which is enhanced with respect to one isotope while the other is correspondingly impoverished with respect thereto.

Of course there are many conditions which must be fulfilled before a calutron can be successfully operated. For example, the ion source, the region surrounding the beam, and the collector must be incorporated in a reduced pressure system evacuated to a pressure of the order of $10^{-5}$ to $10^{-4}$ mm. Hg. Such matters will be herein referred to but briefly, inasmuch as it is with the ion beam producing mechanism, or "source," that the present invention is concerned.

A source for a calutron includes a chamber for holding a quantity of material capable of being vaporized, a heater for the chamber, a cathode and anode for establishing an arc discharge, and accelerating electrodes; the arrangement is such that when the circuits are closed, the material vaporizes and is drawn through the electron stream of the arc where dissociation and ionization take place. The ions are then drawn through a slit by the accelerating electrodes to form a beam.

The most important object of the invention is to produce an ion beam more efficiently than has heretofore been accomplished and to cause the ionization of a greater percentage of the vaporized material.

Another object of the invention is to improve a calutron ion beam source so that it can be operated for a relatively long period without recharging.

An important feature of the invention consists in an arc block provided with an arc chamber connected to a plurality of series-connected charge chambers and means for heating the charge within the chambers.

Another feature of the invention resides in the provision of a protective sheath or housing disposed to surround the cathode on all sides except in the direction of the arc chamber.

Another feature of the invention resides in the provision of means for cooling the stem supporting the arc chamber.

Still another feature of the invention resides in the provision of an adjustment whereby the stem and arc chamber block may be rotated adjustably to register the slit in the arc chamber with the slit formed between a pair of accelerating electrode plates.

These and other objects and features of the invention will more readily be understood and appreciated from the following detailed description of a preferred embodiment thereof selected for purposes of illustration and shown in the accompanying drawings, in which:

Fig. 1 is a diagrammatic plan view showing the general organization of a calutron embodying a source unit constructed according to the invention;

Fig. 2 is a view partly in side elevation and partly in cross section taken along the line 2—2 of Fig. 1;

Fig. 3 is an exploded isometric view of the arc block and associated mechanism;

Fig. 4 is a view in cross section along the line 4—4 of Fig. 2;

Fig. 5 is a view in side elevation showing a detail of the supporting structure;

Fig. 6 is a view in cross section along the line 6—6 of Fig. 2; and

Fig. 7 is a view in cross section along the line 7—7 in Fig. 6.

The calutron is organized around a flat circular vacuum tank disposed between the pole faces of a powerful magnet and containing means for generating a beam of positive ions of a polyisotopic substance such as uranium. The beam of ions is caused to follow a curved path by reason of the magnetic flux flowing between the pole faces of the magnet. As the beam pursues its course, ions of greater mass concentrate along the outer periphery of the beam, whereas ions of lesser mass congregate along the inner periphery thereof. For example, in the case of uranium the ions of $U^{238}$ will be found in the outer portion of the beam, while ions of $U^{234}$ and $U^{235}$ are relatively more predominant in the inner portion. By interposing a suitable receiver or collector in the path of the beam, preferably 180° from its source, separate aggregates of uranium may be collected. One aggregate will be substantially enriched in its percentage of $U^{235}$, and the other aggregate will be correspondingly impoverished with respect thereto.

With reference to Fig. 2 it will be seen that one pole 16 of a relatively massive magnet terminates in a pole face 20 below which is disposed a winding or a coil 18. Resting upon the pole face 20 is the bottom wall 23 of a tank of relatively stout nonmagnetic material such as stainless steel. The bottom wall is shouldered and notched along its periphery to receive the correspondingly formed lower edge of a circular side wall 28 upon which rests a top wall 29. Above the tank thus formed is the upper pole 10 of the magnet terminating in a pole face 12 above which is disposed a winding or coil 14. Interposed between the upper wall 29 of the tank and the upper pole face 12 is a plurality of wedges 26 serving to hold the tank in fixed position. The wedges 26 also serve to jam the walls of the tank together and thus produce a vacuum tight vessel or enclosure. The direction of the magnetic flux flowing between the poles of the magnet is indicated by the arrow 24. The wall 28 is supported by means of four brackets 204 provided with flanged wheels 202 cooperating with a pair of rails 200 disposed between the pole faces of the magnet, the whole comprising means for withdrawing the entire tank and associated structure from the operating position between the poles of the magnet.

The ion beam source unit which forms the subject matter of the present invention is mounted in an aperture formed in the side wall 28. An elongated, hollow, bulbous insulator 30 of heavy glass is sealed against the exterior of the side wall 28, about the aperture formed therein. A collar 36 is bored to receive a number of studs 38 anchored in the side wall 28 and engaged by a plurality of nuts 39. Sealing gaskets 32 and 34 are interposed between the end of the insulator 30 and the wall 28 and between the collar 36 and the outer surface of the insulator 30. When the nuts 39 are tightened, the insulator 30 is clamped securely against the side wall 28.

At its outer end the insulator 30 is clamped against a flat rectangular plate 40 having a centrally disposed aperture therein. A gasket 42 is interposed between the end of the insulator and the plate 40. A collar 46 surrounds the end of the insulator 30 and bears against a ring gasket 44 which surrounds the insulator 30; a plurality of bolts 48 pass through holes in the collar 46 and are received in holes tapped into the plate 40. When the bolts 48 are tightened, the collar 46 draws the insulator tightly against the plate 40.

A metal tube 50, soldered or otherwies suitably secured to the aperture in the wall 28, is aligned with a similar tube 52 fastened to the inner surface of the plate 40 which function together to protect the glass insulator 30 from electron bombardment while the calutron is in operation. As used herein, the terms "inner" and "outer" refer to the location of elements with respect to the tank.

A flat metal plate 54 is secured to the outer surface of the plate 40 by means of four bolts 58 which pass through the plate 54 and are received in holes tapped in the plate 40. The bolt holes 56 in the plate 54 are considerably larger in diameter than the bolts 58, with the result that the plates 40 and 54 may be rotated with respect to one another when the bolts 58 are loosened. Secured to the outer surface of the plate 40 at the bottom thereof is a pair of blocks 60 each of which is provided with a centrally located tapped hole and a set screw 62 working therein; the function of the set screws 62 is to adjust the relative positions of the plates 40 and 54 when the bolts 58 are loosened. When the desired adjustment has been obtained the bolts 58 are tightened and the plates are then securely clamped.

A stout metal plate 64 is pivotally secured to the top of the plate 54 by means of a screw 66, the plate 64 being disposed substantially at right angles to the plate 54. At the bottom of the plate 54 there is pivotally secured an elongated arm 69 held in position by a screw 71 received in a hole tapped in the bottom of the plate 54. The ends of the members 64 and 69 which lie adjacent the plate 54 are curved so that the members are free to pivot to a limited extent about the screws 66 and 71. The plate 64 carries on its lower surface a transverse bracket 68 in one side of which is a set screw 70 which bears against the surface of the plate 54. At its other side the bracket 68 carries a pin 72 which serves as a guide for a helical compression spring 74. A heavy support block 76 is secured to the outer end of the plate 64 by means of a plurality of screws 78, and the block 76 is also secured to the outer end of the arm 69 by a plurality of screws 80. By manipulating the set screw 70 the plates 64 and 69 are caused to pivot about the pins 66 and 71. A ring gear 82 bears against a race of ball bearings 86, carried in a groove formed in the outer surface of the block 76, and is held in position by a pair of L-shaped keepers 84 secured to the ends of the members 64 and 69. The ring gear 82 is internally apertured and threaded to receive corresponding threads formed on the outer surface of a heavy metal tube 88 welded at its inner end to a flexible metal bellows 90 the inner end of which is in turn welded to the outer surface of the plate 54. Relative rotation of the block 76 and the tube 88 is prevented by means of a pin 92 fixed in the plate 76 and extending into a keyway or slot formed in the tube 88. A pinion 94 is keyed to a stub shaft journaled in the plate 76 and meshes with the gear 82. When the pinion is turned, preferably by means of a screw driver inserted in a slot formed in the end of the stub shaft 96, the ring gear 82 also turns and causes the tube 88 to move in and out with respect to the plate 76. The flexible bellows 90 accommodates the axial movement of the tube 88 and also responds to the pivoting adjustment of the tubes 88 obtained by manipulation of the set screw 70 to cause the members 64 and 69 to swing as heretofore described.

At its outer end the tube 88 terminates in a heavy plug to the inner surface of which is secured a long hollow stem 100 adapted to receive a cooling fluid entering a pipe 102 passing through the heavy end of the tube 88 and extending through the length of the stem 100. An outlet conduit 104 also is connected to the stem 100, and it will be seen that the fluid may be fed to the stem 100 through the pipe 102 and back out through the outlet 104. At its inner end and within the tank the stem 100 is provided with a solid plug 106 in which is anchored a long rod 108.

At the inner end of the rod 108, there is welded or otherwise suitably secured a mounting disk 110 provided with holes for the reception of four screws 112 by means of which an elongated block 114 is secured to the disk 110. Secured to the one side of the block 114 is a looped tubular conduit 116 through which a cooling fluid may be passed to cool the block 114 after a run in order that the parts may be safely handled. Another lead 118 supports a thermocouple by means of which the temperature in the region of the arc block 114 may constantly be observed.

The block 114 is provided with a cylindrical bore 120 within which is disposed an electric heating element 122 comprising a ceramic grooved core having an enlarged lower end 124 through which passes a screw 126 used to secure the heating element to the block 114. The ceramic core is wound with high resistance wire 123 of Nichrome or other suitable material. From the bottom 124 there is suspended a terminal 128 cooperating with a pair of leads 130 and 132. Th negative lead 132 is grounded to the disk 110 and the positive lead 130 is led out of the tank along the hollow stem 100 to a suitable source of power.

Formed in the block 114 adjacent the heater 122 is a cylindrical gas or arc chamber 134 in one wall of which there is provided a narrow exit slit 135. The block 114 is also bored to provide a pair of charge chambers 138 interconnected by a passage 142 and connected to the arc chamber 134 by a passage 140. The passages 140 and 142 are formed by drilling transversely through the block and through the chambers 138. The unused portion of the bore is filled with a metal plug 144.

A dished metal cover 146 is secured to the top of the arc block by means of two screws 143 and overlies the arc chamber 134. The bottom of the cover 146 is provided with a small aperture 131 in alignment with the exit slit 135. A flat cover plate 148 is secured to the top of the block 114 in position to overlie the charge chambers 138. A metal hood 150 is secured to the top of the block 114 by a screw 158 and cooperates with the cover 146 to form a tight housing overlying the arc chamber. The housing is dimensioned to receive a pair of clamp blocks 154 between which is suspended a coiled filamentary cathode 152 of tungsten or other suitable material. The clamp blocks 154 are in turn supported by a pair of rigid leads 156 each of which is surrounded by a water jacket 157 so that water may be circulated in through the hollow leads 156 and back out through the water jackets 157. The leads 156 are held rigidly in place by means of a pair of cooperating grooved strips 159 of Bakelite or other insulating material, which are secured to the arc block by the screw 158.

When the heater 122 is energized the material in the charge chambers 138 is vaporized and flows into the arc chamber 134. The filament 152 and the arc block 114 are energized to generate an arc discharge originating at the filament 152 and proceeding through the aperture 131 in the plate 146 down through the exit slit 135. The block 114 is rendered electrically positive with respect to the filament 152 and functions as an anode. The electrons of the arc discharge impinge upon molecules of vapor coming from the charge chambers 138 and have the effect of disassociating and ionizing the molecules. Thereupon positive ions are withdrawn through the exit slit 135 by means of accelerating electrode structure hereafter to be described.

Mounted on the bottom wall 23 of the tank is a bracket 160 upon which is supported a stand 162 providing support for a metal block 166. The block 166 is bored to receive an electric heating element 168 to which power is supplied by means of a pair of leads 170. Mounted on the block 166 facing the arc block 114 is an accelerating electrode plate 172.

A vertical rod 174, secured to the bracket 160, supports a sleeve 178 mounted for rotation on the rod 174 and supporting a flat plate 176. A washer 180 is clamped against the top of the sleeve 178 by means of a screw 182 and serves to retain the sleeve 178 in position. Supported on the plate 176 is a block 184 similar to the block 166 and provided with an electric heating element 186 supplied by means of a pair of conductors 188. Opposing the accelerating electrode plate 172 and secured to the face of the block 184 is a second accelerating electrode plate 190. The relative positions of the plates 172 and 190 may be controlled by swinging the plate 176 about the rod 174 to form between the electrode plates a suitably dimensioned slit through which the ion beam passes. Secured to the plate 176 is a control arm 192 pivotally secured to a rod 194 passing through the wall 28 of the tank and supported by a mount 196 containing means for translating the rod 194 axially controlled by means of a crank 198 disposed outside the tank. By manipulating the crank 198 the rods 194 and 192 are moved to swing the plate 176 about the rod 174 and thus to provide adjustment for the plate 190 with respect to the plate 172.

It will be evident that I have disclosed a novel ion source unit for a calutron characterized by an increase in capacity in that a plurality of charge chambers are provided and series connected to an arc chamber. Furthermore, the housing surrounding the cathode 152 prevents deterioration of the cathode due to condensation of vapor thereon as well as inhibits the formation of brittle alloys occasioned by the bombardment of the filament by ions in the tank.

Moreover, the provision of means to secure an adjustment of the slit between the accelerating electrodes and the exit slit from the arc chamber introduces a new control factor and provides the operators of the device with means to secure a stable and intense beam.

Having now disclosed and illustrated a preferred embodiment of my invention, what I claim as new and desire to secure by Letters Patent of the United States is:

1. An ion source for a calutron comprising a block having a plurality of interconnected chambers formed therein for storing material to be ionized, means for heating said chambers for forming a vapor of said material, said block having a slit forming an exit from one of said chambers, an electron-emissive cathode disposed to overlie the end of said chamber having said exit slit, housing means secured to said block and overlying said cathode, stem means fastened to said block and rotatably mounted within said calutron, means for impressing a voltage between said cathode and said block for producing an arc discharge therebetween, means for establishing a magnetic field in alignment with said arc, and means for withdrawing ions formed in said arc.

2. An ion source for a calutron comprising a block having a plurality of interconnected chambers formed therein for storing material to be ionized, heater means for heating said chambers thereby vaporizing said material, said block having a slit forming an exit from one of said chambers, an electron-emissive cathode disposed to overlie the end of said chamber having said exit slit, vapor-tight housing means secured to said block and overlying said cathode, a hollow stem fastened to said block and rotatably mounted within said calutron, means for impressing a voltage between said cathode and said block for producing an arc discharge therebetween, means for establishing a magnetic field in alignment with said arc discharge, and means for withdrawing ions formed in said arc.

3. An ion source for a calutron comprising a block having a plurality of interconnected chambers formed therein for storing material to be ionized, a heater disposed within said block for vaporizing said material, said block having a slit forming an exit from one of said chambers, an electron-emissive cathode disposed to overlie the end of said chamber having said exit slit, a vapor-tight housing secured to said block and overlying said cathode, a hollow stem secured at one end to said block and rotatably mounted at the other end through a wall of said calutron, means for circulating a cooling fluid from the exterior of said calutron through said stem, means for impressing a voltage between said cathode and said block for producing an arc discharge therebetween, means for establishing a magnetic field in alignment with said arc discharge, and means for withdrawing ions formed in said arc.

References Cited in the file of this patent

UNITED STATES PATENTS

| | | |
|---|---|---|
| 1,143,327 | Snook et al. | June 15, 1915 |
| 1,983,679 | Scofield | Dec. 11, 1934 |
| 2,221,467 | Bleakney | Nov. 12, 1940 |
| 2,373,151 | Taylor | Apr. 10, 1945 |
| 2,374,205 | Hoskins | Apr. 24, 1945 |
| 2,378,962 | Washburn | June 26, 1945 |